US011360550B2

(12) United States Patent
Wang et al.

(10) Patent No.: US 11,360,550 B2
(45) Date of Patent: Jun. 14, 2022

(54) IMU FOR TOUCH DETECTION

(71) Applicant: Apple Inc., Cupertino, CA (US)

(72) Inventors: Lejing Wang, Sunnyvale, CA (US); Rohit Sethi, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/355,320

(22) Filed: Jun. 23, 2021

(65) Prior Publication Data

US 2021/0318748 A1 Oct. 14, 2021

Related U.S. Application Data

(63) Continuation of application No. 16/584,491, filed on Sep. 26, 2019, now Pat. No. 11,073,898.

(60) Provisional application No. 62/738,746, filed on Sep. 28, 2018.

(51) Int. Cl.
| | | |
|---|---|---|
| G06F 3/01 | (2006.01) | |
| G06F 3/042 | (2006.01) | |
| G06T 17/00 | (2006.01) | |
| G06T 1/00 | (2006.01) | |
| G06T 7/20 | (2017.01) | |
| G06T 7/70 | (2017.01) | |

(52) U.S. Cl.
CPC ............ *G06F 3/011* (2013.01); *G06F 3/0425* (2013.01); *G06T 1/0007* (2013.01); *G06T 7/20* (2013.01); *G06T 7/70* (2017.01); *G06T 17/00* (2013.01); *G06T 2200/04* (2013.01); *G06T 2207/10028* (2013.01); *G06T 2207/30196* (2013.01)

(58) Field of Classification Search
CPC .......... G06F 3/011; G06F 3/0425; G06T 7/70; G06T 7/20; G06T 17/00; G06T 2200/04; G06T 2207/10028; G06T 2207/30196
See application file for complete search history.

(56) References Cited

U.S. PATENT DOCUMENTS

| | | |
|---|---|---|
| 2006/0279549 A1 | 12/2006 | Zhang |
| 2008/0030458 A1 | 2/2008 | Helbing |
| (Continued) | | |

FOREIGN PATENT DOCUMENTS

| | | |
|---|---|---|
| CN | 102308267 A | 1/2012 |
| CN | 102591533 A | 7/2012 |
| (Continued) | | |

OTHER PUBLICATIONS

Booth, Riley and Peter Goldsmith, "Detecting finger gestures with a wrist worn piezoelectric sensor array," IEEE International Conference on Systems, Man, and Cybernetics (SMC), Oct. 5-8, 2017.

(Continued)

*Primary Examiner* — Ariel A Balaoing
(74) *Attorney, Agent, or Firm* — Blank Rome LLP

(57) ABSTRACT

Touch detection may include determining, based on data from an IMU on a first device that monitors movement of a touching object, a touch event, wherein the touch event indicates contact between the touching object and a surface, obtaining a depth image captured by a second device, comprising a touch image, determining a touch point of the object based on the touch image, and providing a response based on the touch point of the object and the touched surface.

20 Claims, 5 Drawing Sheets

(56) References Cited

U.S. PATENT DOCUMENTS

| | | | | |
|---|---|---|---|---|
| 2008/0317331 | A1* | 12/2008 | Winn | G06F 3/017 |
| | | | | 382/154 |
| 2010/0039394 | A1* | 2/2010 | Moussavi | G06F 3/017 |
| | | | | 345/173 |
| 2010/0085330 | A1* | 4/2010 | Newton | G06F 3/0425 |
| | | | | 345/175 |
| 2010/0104134 | A1* | 4/2010 | Wang | G06F 3/0304 |
| | | | | 382/103 |
| 2011/0288964 | A1 | 11/2011 | Linder | |
| 2013/0234972 | A1 | 9/2013 | Bogsanyi | |
| 2013/0271350 | A1 | 10/2013 | Lyons | |
| 2014/0062875 | A1 | 3/2014 | Rafey | |
| 2015/0261373 | A1* | 9/2015 | Smus | G06F 3/04883 |
| | | | | 345/174 |
| 2015/0279019 | A1* | 10/2015 | Hsin | G06T 7/194 |
| | | | | 348/77 |
| 2015/0338916 | A1* | 11/2015 | Priyantha | G06F 3/041 |
| | | | | 345/173 |
| 2016/0077587 | A1* | 3/2016 | Kienzle | G06F 3/0383 |
| | | | | 345/156 |
| 2016/0088206 | A1 | 3/2016 | Robinson | |
| 2016/0139690 | A1* | 5/2016 | Chang | G06F 3/0338 |
| | | | | 345/179 |
| 2018/0286126 | A1 | 10/2018 | Schwarz | |
| 2019/0302963 | A1 | 10/2019 | Harrison | |

FOREIGN PATENT DOCUMENTS

| | | |
|---|---|---|
| CN | 103207709 A | 7/2013 |
| CN | 104679233 A | 6/2015 |
| CN | 104793784 A | 7/2015 |
| KR | 20170037585 A | 4/2017 |

OTHER PUBLICATIONS

Humphries, Matthew, "Microsoft Research develops Digits wrist-mounted motion sensor," Oct. 9, 2012, Retrieved from the Internet: URL: https://www.geek.com/games/microsoft-research-develops-digits-wrist-mounted-motion-sensor-1521067/ [retrived on Aug. 1, 2018].

Wen, et al., "Serendipity: Finger Gesture Recognition using an Off-the-Shelf Smartwatch," CHI'16, May 7-12, 2016, San Jose, CA, USA.

* cited by examiner

IMU FOR TOUCH DETECTION

BACKGROUND

This disclosure relates generally to the field of touch detection, and more specifically to the field of providing an IMU for touch detection.

Today's electronic devices provide users with many ways to interact with the world around them. For example, users may interact with electronic devices using virtual or physical keyboards, mice, trackballs, joysticks, touch screens, and the like. One way that users often interact with digital information on their device is through a touch screen interface. Touch screen interfaces allow a user to interact with a display surface using a finger, stylus, or other object. A touch sensor recognizes the area touched and provides a response to a user.

With the rise of mixed reality environments, users often provide input by additional means in order to enable virtual objects to interact with real objects. As an example, a user may touch a real object in order to interact with the real object in a mixed reality manner. However, real objects often do not include touch sensors which are traditionally utilized to detect touch from a user.

SUMMARY

In one embodiment, a method for touch detection is described. The method may include determining, based on data from an inertial measurement unit (IMU) on a first device that monitors movement of a touching object, a touch event, wherein the touch event indicates contact between the touching object and a surface. The method may also include, in response to a touch event, obtaining a depth image captured by a second device, comprising a touch image, determining a touch point of the object based on the touch image, and providing a response based on the touch point of the object and the touched surface.

In another embodiment, the method may be embodied in computer executable program code and stored in a non-transitory storage device. In yet another embodiment, the method may be implemented in an electronic device.

DETAILED DESCRIPTION

Figure 1:
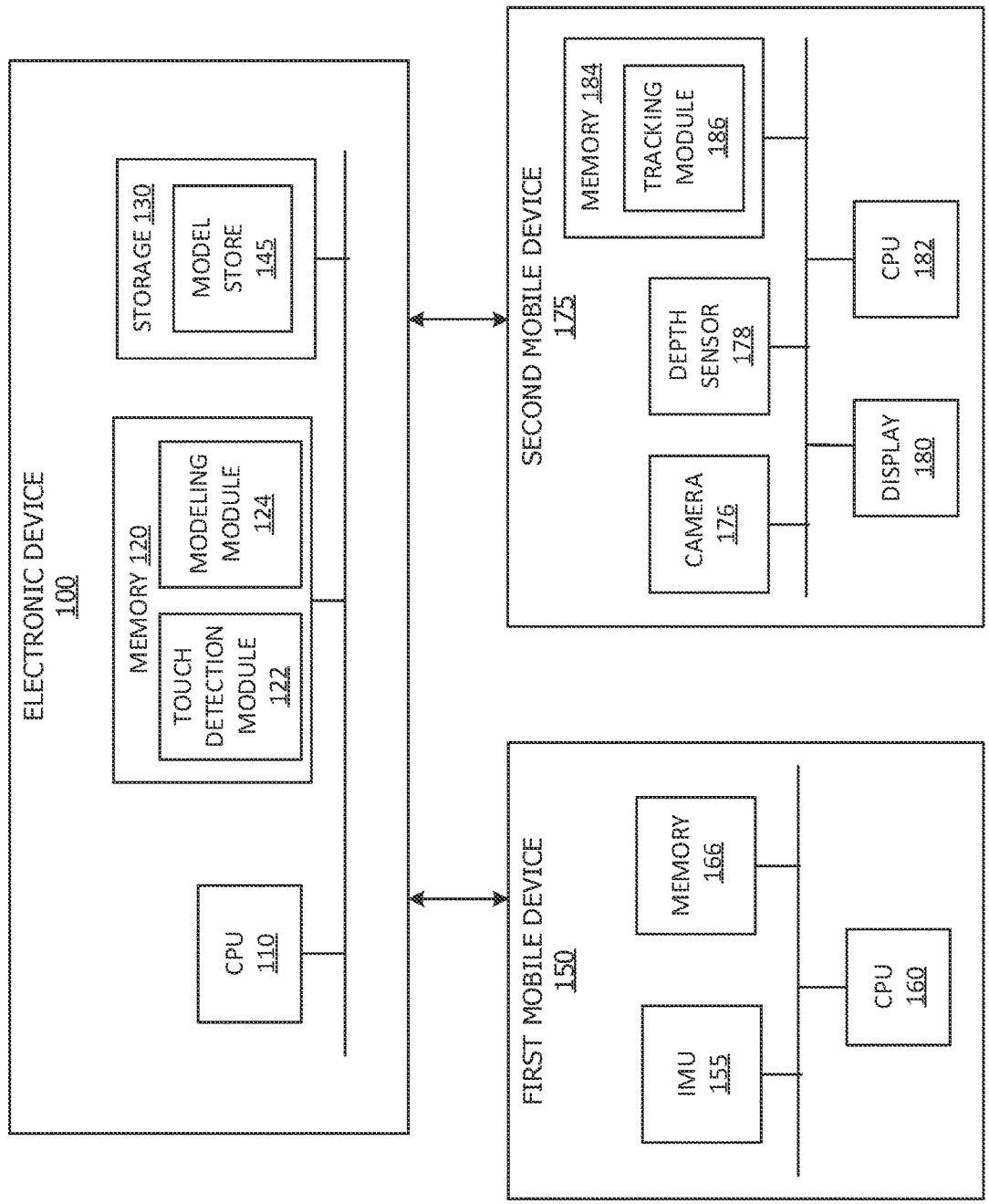
FIG. 1 shows, in block diagram form, a simplified system diagram according to one or more embodiments.

This disclosure is directed to systems, methods, and computer readable media for detecting touch in a physical environment. In general, techniques are disclosed to provide a technique for identifying when a user touches a surface in a physical environment using an inertial measurement unit, and a technique for refining a model of a touching object, such as a finger, in response to detecting a touch in a physical environment. In addition, the disclosure is related to a technique for estimating the physical environment, e.g. estimating normal/directions of the physical surface.

According to one or more embodiments, a wearable device, such as a watch or a ring, may be worn by a user interacting with a physical environment. The wearable device may include an inertial measurement unit ("IMU"), which may track force, acceleration, acoustic signal (e.g. generated by the user interacting with the physical environment), and the like, for an object to which it is attached. In one or more embodiments, the wearable may be worn by a user in a physical environment. Particularly, the wearable device may be worn, for example, on the arm, wrist, or finger that is, or is connected to, a finger interacting with the physical environment by touch. In one or more embodiments, a touch event may be determined based on sensor data from the IMU. For example, a detected force may indicate a touch event. The touch event may indicate contact between a touching object and a surface. The surface may be part of an object in a real environment, or may be another part of the user, such as a hand or a finger. In response to detecting the touch event, a touch image of the touch event may be obtained, which includes the touching object and the surface being touched. The touch image may be captured by a second device. The touch image may be an RGB image or a depth image. Based on the touch image, the touched surface may be determined, and a response may be provided to the user based on the touched surface. The user parts (e.g. hand or finger) may be first detected in the image, and the surface is determined as a surface which extends underneath the user parts.

In one or more embodiments, the touch image may be utilized to generate or refine a model of the touching object. Specifically, the image, such as a depth image, captured by the second device may not capture the portion of the touching object making contact with the surface. However, in one or more embodiments, data regarding the geometric shape of the touching object at the touch point may be determined based on depth information from the touch image. For example, the depth image may be obtained from a perspective such that the touch point is occluded by the touching object (e.g., the fingertip touching a surface may be occluded by the hand from the point of view of the user). A model of the touching object (e.g., the finger, hand, or arm) may be generated or refined based on the combined data from the touch image and the touch detection. For example, a particular length of the finger may be determined even though the touching portion of the finger is occluded based on the relative location of the surface the finger is touching, and depth information regarding the visible portion of the finger in the touch image. The touch image may be used as a reference image to determine contact status between the finger and the surface. For example, a release motion (i.e. the finger moves away from the surface) may be determined by comparing the reference image and a current captured image, for example by comparing the distances of the finger to the camera or comparing the distances of the finger relative to the surface.

In addition, in one or more embodiments, the touch image may be utilized to determine false positives from the detected touch. For example, an IMU may detect a touch based on a particular force, but the force may not be related to a touch. As an example, the force may be related to a jerk of an arm or wrist. Accordingly, in one or more embodiments, a secondary device may capture a "touch image" at the time the touch event is detected, and determine, based on the touch image, whether the touch event was a true touch event. For example, if the image captured at the time of the detected touch shows the touching object nowhere near a surface, it may be determined that the detected touch event was a false positive touch event. A deep learning based method could be used to classify the real touch event from other non touch events, like a jerk of an arm or wrist. The classification could be based on IMU data. The deep learning network could be LSTM (Long short-term memory), RNN (Recurrent Neural Networks), or any temporal related networks.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images with different points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Referring to FIG. 1, a simplified block diagram of an electronic device 100 is depicted, communicably connected to a first mobile device 150 and a second mobile device 175, in accordance with one or more embodiments of the disclosure. Electronic device 100 may be part of a multifunctional device, such as a mobile phone, tablet computer, personal digital assistant, portable music/video player, wearable device, base station, laptop computer, desktop computer, network device, or any other electronic device. FIG. 1 shows, in block diagram form, an overall view of a system diagram capable of providing touch detection using an inertial measurement unit ("IMU"). Electronic device 100 may be connected to first mobile device 150 and second mobile device 175 across a network, a wired connection, a Bluetooth or other short range connection, among others. First mobile device 150 may be a smart accessory, such as a smart watch worn on a user's wrist or arm, a smart ring worn on a user's finger, or any other electronic device that includes an IMU from which at least some movement of the user may be determined. Second mobile device 175 may include, for example, a head mounted device which includes a camera or other sensors and which may communicate with the first mobile device 150 either directly or via electronic device 100. In one or more embodiments, second mobile device 175 may not be a wearable device, and may simply be an electronic device with the capability of capturing touch images that indicate depth information in a physical environment.

Electronic Device 100 may include processor, such as a central processing unit (CPU) 110. Processor 110 may be a system-on-chip such as those found in mobile devices and include one or more dedicated graphics processing units (GPUs). Further processor 110 may include multiple processors of the same or different type. Electronic Device 100 may also include a memory 120. Memory 120 may each include one or more different types of memory, which may be used for performing device functions in conjunction with processor 110. For example, memory 120 may include cache, ROM, RAM, or any kind of transitory or non-transitory computer readable storage medium capable of storing computer readable code. Memory 140 may store various programming modules for execution by processor 110, including touch detection module 122 and modeling module 124. Electronic device 100 may also include storage 130. Storage 130 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may include a model store 145.

First mobile device 150 and second mobile device 175 may each be electronic devices with components similar to those described above with respect to electronic device 100. First mobile device 150, may include, for example, a memory 166 and CPU 160. First mobile device 150 may also include IMU 155. IMU 155 may be a sensor that detects a sudden change in acceleration. As such, IMU 155 may include an accelerometer, a gyroscope, and the like. First mobile device 150 may be worn by a user in such a manner that the IMU detects change in inertia that indicates a touch event. For example, first mobile device 150 may be part of a watch or other device worn on a user's arm or wrist, and tracks inertial changes of a part of the user interacting with a physical environment (e.g., a finer on the arm on which the first mobile device is worn).

Second mobile device 175 may be any kind of electronic device (e.g., wearable or non-wearable) that includes one or more cameras 176 or other sensors, such as depth sensor 178, from which depth of a scene may be determined. In one or more embodiments, each of the one or more cameras 176 may be a traditional RGB camera, or a depth camera. Further, cameras 176 may include a stereo- or other multi-camera system, a time-of-flight camera system, or the like which capture images from which depth information of a scene may be determined. Second mobile device 175 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display 180 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In one or more embodiments, touch detection module 122 may determine when a touch event has occurred. A touch event may indicate that a contact has likely been made between a touching object and a surface. The touch detection module 122 may determine when a touch event occurs, for example, by receiving an indication from first mobile device 150 that a touch event has occurred. Further, in one or more embodiments, the touch detection module 122 may receive a signal from IMU 155, and determine, based on the signal, that a touch event has occurred. According to one or more embodiments, the touch detection module 122 may utilize additional data to verify that a touch event has actually occurred. For example, the touch detection module 122 may obtain depth information from second mobile device 175, such as from one or more of the cameras 176 and/or depth sensor 178. In one or more embodiments, upon determining a touch event has occurred, the touch detection module 122 may verify that the touch event has actually occurred based on the depth data from second mobile device 175. As an example, if the depth information indicates that the touching object isn't anywhere near a surface, then the touch detection module 122 may determine that the touch event is a false touch event.

In one or more embodiments, the modeling module 124 may manage models of touching objects. For example, the modeling module 124 may manage models of touching objects, such as fingers, in model store 145. The modeling module 145 may register fingers or other touching objects used to interact with a physical environment. In one or more embodiments, a user may initiate use of a particular touching object in a number of ways, such as signing into a user account associated with the touching object, or utilizing object detection to determine a particular touching object is in use. For example, a user may spin a finger in front of a camera, such as camera 176 of the second mobile device 175, such that the modeling module 124 and the touch detection module 122 may begin using the touch techniques and modeling techniques based on a model of the particular recognized finger. As an example, an initial model of the particular recognized finger may be obtained from the model store 145 and utilized for the various techniques described herein.

According to one or more embodiments, the 3D model of the touching object, having been refined based on the touch image or other depth data, may then be used for more accurate touch detection and other tracking by the second mobile device 175. In one or more embodiments, by having better data regarding, for example, the total length or other characteristics of the touching object, the tracking module 186 may better detect touch events in a physical environment when the first mobile device 150 or the IMU 155 is unavailable, or is otherwise not utilized to detect inertial data by the touching object.

Although electronic device 100 is depicted as comprising the numerous components described above, in one or more embodiments, the various components may be distributed across multiple devices. Particularly, in one or more embodiments, one or more of the touch detection module 122, modeling module 124, and model store 145 may be distributed differently across the first mobile device 150 and second mobile device 175. Thus, the electronic device 100 may not be needed to perform one or more techniques described herein, according to one or more embodiments. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
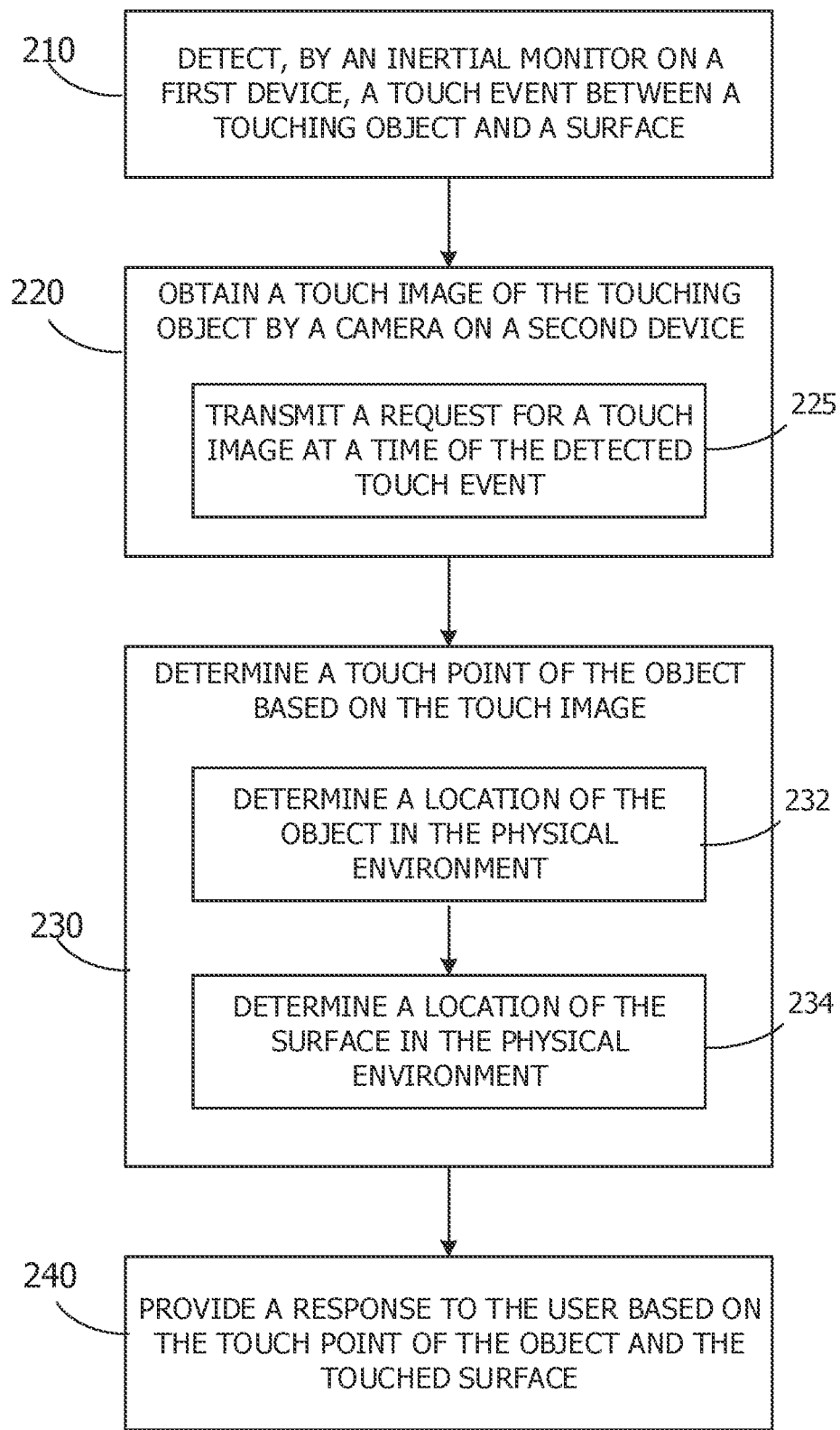
FIG. 2 shows, in flow chart form, an example technique for detecting touch in a real environment, according to one or more embodiments.

FIG. 2 shows, flow chart form, a method for utilizing touch detection in a physical environment. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 210, and an inertial monitor unit on a first device detects a touch event between a touching object and a surface. According to one or more embodiments, the IMU 155 of the first mobile device 150 may be any sensor that detects movement information for a touching object. As an example, IMU 155 may detect such movement as acceleration, direction, and the like. In one or more embodiments, the touch event may be detected when a change in inertia indicates that contact has been made between the touching object (e.g., the object for which inertia and other movement information is being detected). Contact may be detected, for example, when the movement information for the touching device indicates a sudden stop or change in direction. Accordingly, as will be described in greater detail below, a detected touch event may not be a true touch event. For purposes of this flowchart, the detected touch event is considered a true touch event.

The flowchart continues at 220, where a touch image of the touching object is obtained by a camera on the second device. The touch image may include an RGB image of the object, a depth image of the object, a stereo image of the object, or other data that indicates a depth of the object with respect to the second mobile device 175. In one or more embodiments, the detection of the touch event by a first electronic device 150 indicates that image data should be captured by a secondary device. At 225, obtaining the touch image may include transmitting a request for a touch image at a time of the detected touch event. For example, transmitting the request may include the first mobile device 150 transmitting a notification to electronic device 100 that a touch event has occurred such that the touch image may be obtained by the electronic device 100 from the second device 150. Alternatively, transmitting the request may include transmitting, from the first mobile device 150, the notification directly to the second mobile device 175 for processing the detected touch. Further, in one or more embodiments, the notification may include a time stamp by which the electronic device 100 and/or the second mobile device 175 may determine a time at which depth or image data should be captured.

The flowchart continues at 230 where the touch detection module 122 determines a touch point of the object based on the touch image. In one or more embodiments the touch point may be determined in a coordinate system associated with the first mobile device 150, the second mobile device 175, or the electronic device 100. In one or more embodiments, the location may be determined in a coordinate system of the second mobile device 175, which detects the depth of the touching object and the sensor. In one or more embodiments, at 232, the touch detection module 122 may determine a location of the touching object in the physical environment. According to one or more embodiments, the location of the touching object in the physical environment may be determined based, at least in part, on a 3D model of the touching object. For example, electronic device 100 may include a model store 145 that includes a model of the touching object. As described above, to initiate the process, a user may register a particular touching object, for example by waving the touching object in a predetermined motion in front of camera 176 to be detected and identified. Accordingly, the location of the touching object in the physical environment may be based on a combination of the pre-stored 3D model of the touching object along with the touch image.

At 234, a location of the surface in the physical environment is determined. In one or more embodiments, the location of the surface may be determined, in part, based on the touch image. As an example, a region of the surface adjacent to or surrounding the touching portion may be identified and the depth of which may be determined based on the touch image. In another embodiment, camera 176 and/or depth sensor 178 may continuously capture depth information that is cached for a predetermined period of time (e.g., 5 seconds, etc.). According to one or more embodiments, the second mobile device 175 may obtain the touch image from the cached depth data, for example, based on a time stamp received from the first mobile device 150 at a time of the detected touch event. In addition, in one or more embodiments, the second mobile device 175 may obtain a non-touch image from before or after the touch event, which may show the portion of the surface touched during the touch event. As such, the second mobile device 175 may determine the location of the surface in the physical environment based on a comparison of the touch image with the non-touch image to identify the touch location, and to determine depth information for the touched portion of the surface in the real environment. In one or more embodiments, the location of the touched portion may be determined in the coordinate system of the second mobile device 175 or in a coordinate system common to that of the coordinate system in which the location of the touching object is determined at 232.

The flowchart concludes at 240 where the second mobile device 175 provides a response to the user based on the touch point of the object and the touched surface. In one or more embodiments, the response may be presented by the second mobile device 175, for example, on display 180. As described above, second mobile device 175 may provide an interface for a virtual reality, augmented reality, and/or mixed reality system. In one or more embodiments, the physical touch in the physical environment by the user may elicit a virtual response, such as the generation and/or display of virtual information.

Figure 3:
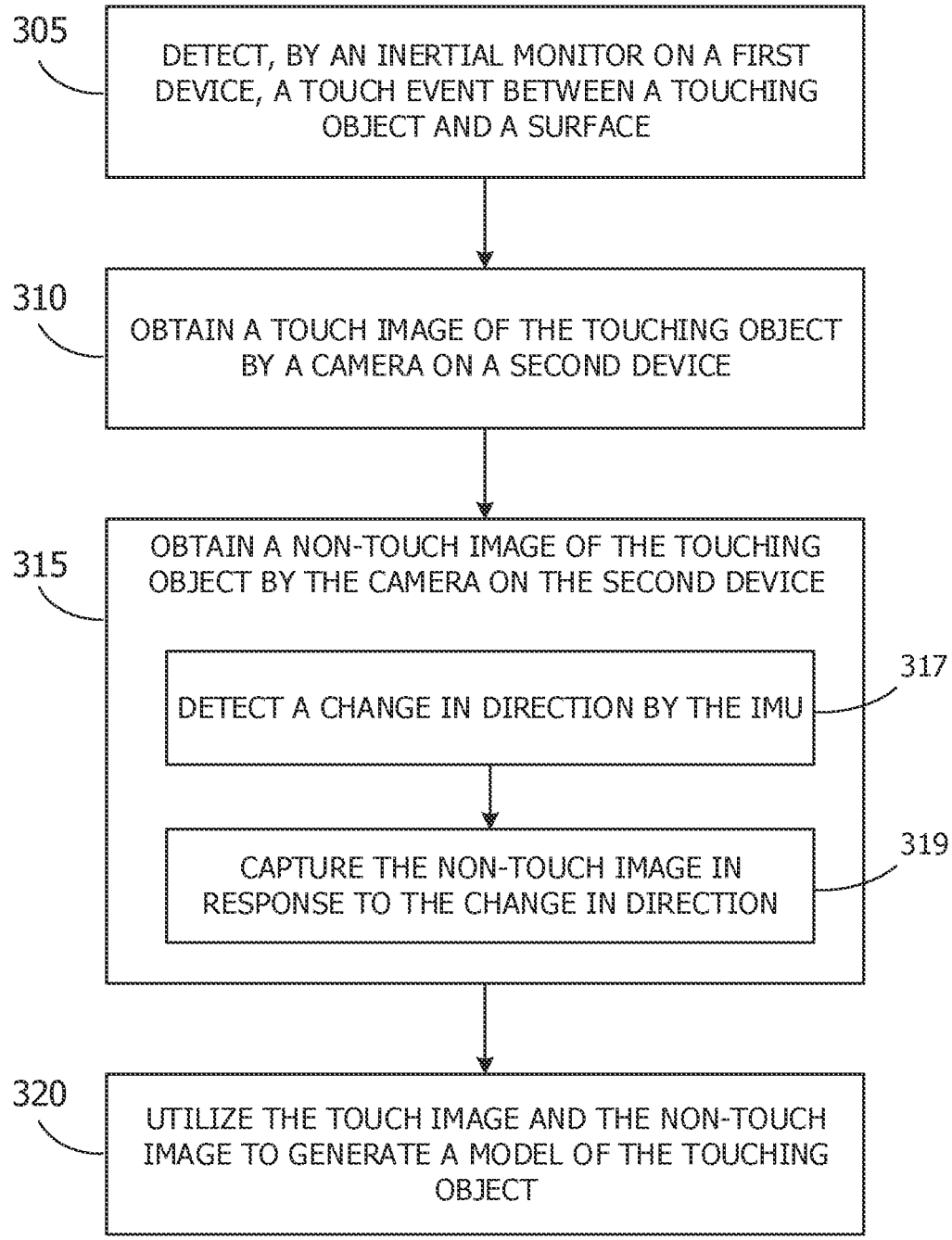
FIG. 3 shows, flow chart form, an example technique for generating a model, in accordance with one or more embodiments.

Referring now to FIG. 3, a flowchart is presented describing a technique for utilizing the touch image to generate a 3D model of the touching object. In one or more embodiments, by capturing depth information of a touching object along with a point of touch in a physical environment, the system may obtain better modeling information for the touching object. Accordingly, touch detection may be improved in the future when the IMU and/or first mobile device 155 is unavailable or is otherwise not used for touch detection.

The flowchart begins at 305 where the first mobile device 150 detects, by an IMU, a touch event between a touching object and a surface. As described above, the IMU may detect a touch event in response to a change in inertia that may indicate a contact between a touching device whose motion is being monitored by the IMU and a surface in the physical environment. As an example, the IMU 155 may detect a potential touch event in response to a sudden stop or a change of direction of the touching object.

The flowchart continues at 310, and the first mobile device obtains a touch image of the touching object by a camera on the second device. As described above, the touch image may include an RGB image of the object, a depth image of the object, a stereo image of the object, or other data that indicates a depth of the object with respect to the second mobile device 175. In one or more embodiments, the detection of the touch event by a first electronic device 150 indicates that image data should be captured by a secondary device. In one or more embodiments, the camera may provide less accuracy than the IMU that a touch event has occurred, for example in a situation where a touch is occluded, and or because the IMU obtains sensor data at a faster rate than the camera. As such, image data captured by the camera may be cross-referenced or supplemented with IMU data to determine a more precise moment at which a touch occurs.

At 315, the second mobile device 175 obtains a non-touch image of the touching object by the camera on the second device. As described above, camera 176 and/or depth sensor 178 may continuously capture depth information that is cached for a predetermined period of time (e.g., 5 seconds, etc.). According to one or more embodiments, the second mobile device 175 may obtain the touch image from the cached depth data, for example, based on a time stamp received from the first mobile device 150 at a time of the detected touch event. In addition, in one or more embodiments, the second mobile device 175 may obtain a non-touch image from before or after the touch event, which may be an image captured just before the timestamp of the touch event. As such, the second mobile device 175 may determine a very close non-touch pose of the touching object.

Alternatively, or additionally, non-touch images may be obtained in other ways. For example, at 317, a change in direction may be detected by the IMU. Then, at 319, the second mobile device 175 captures the non-touch image in response to the change in direction. Accordingly, the non-touch image and/or depth data may be captured after the touch occurs based on a determination that the touching object has 1) made contact with the surface; and 2) changed directions. That is, merely capturing image data after a touch event occurs may be insufficient because a touching object may touch the surface and linger on the surface, thereby remaining in a touching position, after a touch event is detected.

The flowchart concludes at 320, and the modeling module 124 utilizes the touch image and the non-touch image to generate a model of the touching object. For example, by determining a pose of the touching object at a point of touch with the surface and a non-touch pose very close to the surface, the modeling module 124 may be able to generate or refine a provided 3D model of the touching object for later use for touch detection without the use of the IMU.

Figure 4:
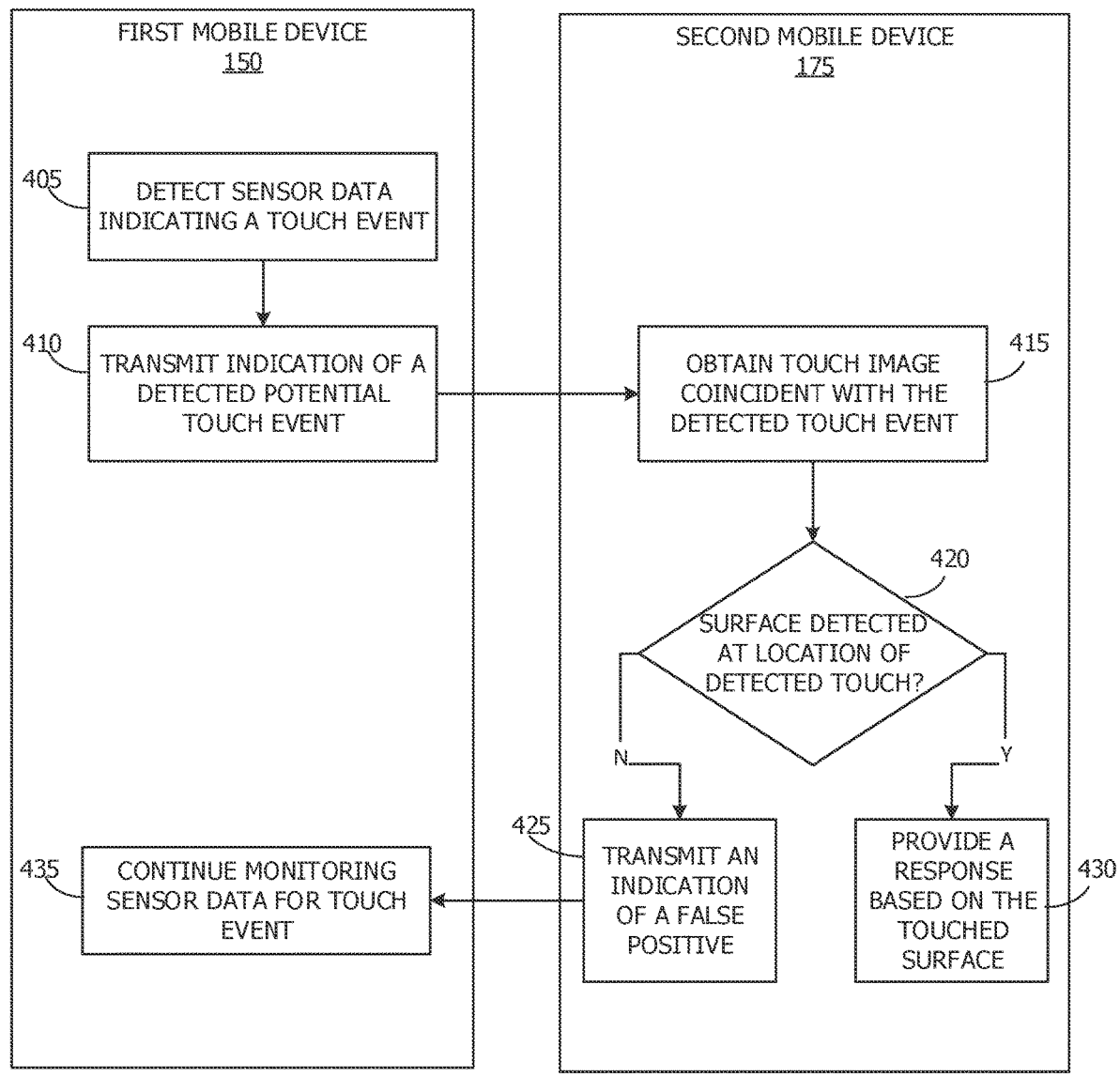
FIG. 4 shows, in flow chart form, an example technique for identifying true touch events, according to one or more embodiments.

Referring now to FIG. 4, a flowchart is presented that depicts a technique for utilizing the inertial measurement from a first device and depth information captured from a second device to distinguish between actual touches in a physical environment, and false positives based on the IMU data.

The flowchart begins at 405, and the first mobile device 150 detects sensor data indicating a touch event. As described above, the IMU may detect a touch event in response to a change in inertia that may indicate a contact between a touching device whose motion is being monitored by the IMU and a surface in the physical environment. As an example, the IMU 155 may detect a potential touch event in response to a sudden stop or a change of direction of the touching object.

The flowchart continues at 410, and the mobile device 150 transmits an indication of a detected potential touch event. According to one or more embodiments, the mobile device 150 may transmit other contextual information regarding the touch event, such as a time stamp indicating a time at which the event occurred, or other data regarding the touch event. In one or more embodiments, the At 415, the second mobile device 175 obtains a touch image coincident with the detected touch event.

The flowchart continues at 420 where a determination is made regarding whether a surface is detected at a location of the detected touch. In one or more embodiment, the determination may be made based on a determined location of the surface at the time of the touch event. As an example, a region of the surface adjacent to or surrounding the touching portion may be identified and the depth of which may be determined based on the touch image. In another embodiment, camera 176 and/or depth sensor 178 may continuously capture depth information that is cached for a predetermined period of time (e.g., 5 seconds, etc.). According to one or more embodiments, the second mobile device 175 may obtain the touch image from the cached depth data, for example, based on a time stamp received from the first mobile device 150 at a time of the detected touch event. In addition, in one or more embodiments, the second mobile device 175 may obtain a non-touch image from before or after the touch event, which may show the portion of the surface obfuscated during the touch event. As such, the second mobile device 175 may determine the location of the surface in the physical environment based on a comparison of the touch image with the non-touch image to identify the touch location, and to determine depth information for the touched portion of the surface in the real environment.

Similarly, a location of the touching object in the physical environment is determined. In one or more embodiments, the touch detection module 122 may determine a location of the touching object in the physical environment. According to one or more embodiments, the location of the touching object in the physical environment may be determined based, at least in part, on a 3D model of the touching object. For example, electronic device 100 may include a model store 145 that includes a model of the touching object. Thus, by determining a depth of the visible portion of the touching object, the location of the touching portion of the touching object may be estimated based on depth information for the visible portion of the touching object and the 3D model of the touching object.

By comparing the determined location of the touching object with the determined location of the surface, it may be determined whether the touching object is actually touching a surface at the time of the touch event. If, at 420, a surface is detected at a location of the detected touch, then the flowchart continues at 430 where a response is provided based on the touched surface. In one or more embodiments, the response may be presented by the second mobile device 175, for example, on display 180. As described above, second mobile device 175 may provide an interface for a virtual reality, augmented reality, and/or mixed reality system. In one or more embodiments, the physical touch in the physical environment by the user may elicit a virtual response, such as the generation and/or display of virtual information. The response may be based on, for example, a touched portion of a surface. In another example, the response may be based on a particular gesture identified (e.g., a pinch of two fingers, a tap on a user, a hand or finger touching a palm, and the like). A gesture may be identified using the touch image captured coincident with the detected touch event. The location of the touch and/or a gesture associated with the touch may be associated with a particular action or command to be undertaken by the electronic device 100, first mobile device 150, and/or second mobile device 175.

Returning to 420, if a determination is made that a surface is not detected at a location of the detected touch, then the flowchart continues at 425 and the second mobile device 175 transmits an indication of the false positive to the first mobile device 150. The flowchart concludes at 435 where the first mobile device 150 continues to monitor sensor data from the IMU 155 to detect a potential touch event. According to one or more embodiment, the mobile device 150 may additionally provide a notification of the false positive, for example through one or more interfaces of the second mobile device 175.

Figure 5:
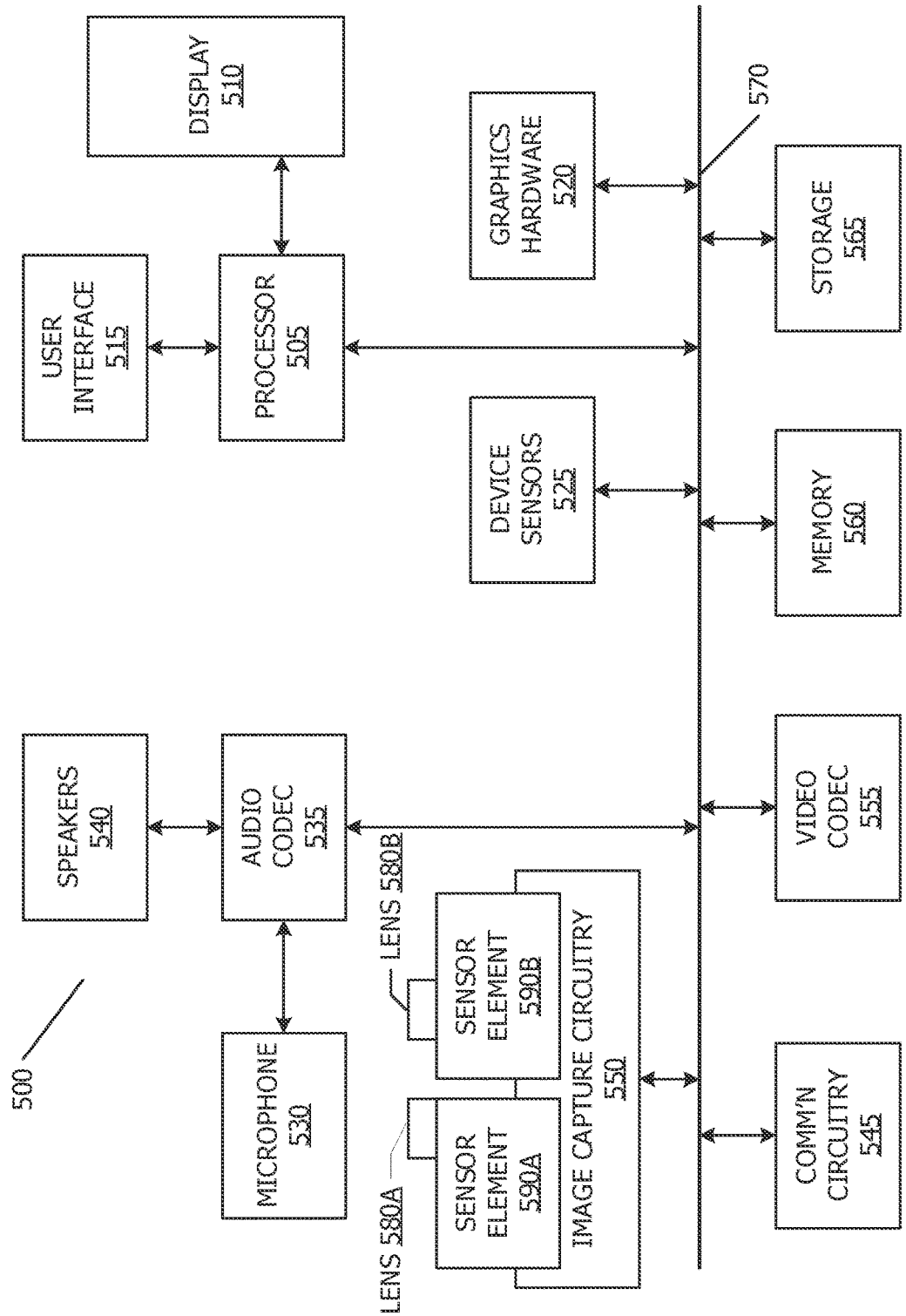
FIG. 5 shows, in block diagram form, a simplified multifunctional device according to one or more embodiments.

Referring now to FIG. 5, a simplified functional block diagram of illustrative multifunction electronic device 500 is shown according to one embodiment. Each of electronic device 100, first mobile device 150 and second mobile device 175 may be a multifunctional electronic device, or may have some or all of the described components of a multifunctional electronic device described herein. Multifunction electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture circuitry 550 (e.g., including camera system) video codec(s) 555 (e.g., in support of digital image capture unit), memory 560, storage device 565, and communications bus 570. Multifunction electronic device 500 may be, for example, a digital camera or a personal electronic device such as a personal digital assistant (PDA), personal music player, mobile telephone, or a tablet computer.

Processor 505 may execute instructions necessary to carry out or control the operation of many functions performed by device 500 (e.g., such as the generation and/or processing of images as disclosed herein). Processor 505 may, for instance, drive display 510 and receive user input from user interface 515. User interface 515 may allow a user to interact with device 500. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable GPU.

Image capture circuitry 550 may include two (or more) lens assemblies 580A and 580B, where each lens assembly may have a separate focal length. For example, lens assembly 580A may have a short focal length relative to the focal length of lens assembly 580B. Each lens assembly may have a separate associated sensor element 590. Alternatively, two or more lens assemblies may share a common sensor element. Image capture circuitry 550 may capture still and/or video images. Output from image capture circuitry 550 may be processed, at least in part, by video codec(s) 555 and/or processor 505 and/or graphics hardware 520, and/or a dedicated image processing unit or pipeline incorporated within circuitry 565. Images so captured may be stored in memory 560 and/or storage 565.

Sensor and camera circuitry 550 may capture still and video images that may be processed in accordance with this disclosure, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

According to one or more embodiments, camera-based transparent display may have numerous uses. For example, the techniques described above may be used for image stabilization. That is, a warping function utilized to warp the image may also be utilized to stabilize an image. In another embodiment, the camera-based transparent display may be used for machine learning. For example, a camera may capture images of a scene and classify the scene, and/or objects within the scene. In one or more embodiments, by tracking an object at which a user's eye is gazing, objects may be identified which should be classified.

In one or more embodiments, the camera-based transparent display may be used for presenting virtual information on the display, for example for augmented reality purposes. As an example, digital information associated with a particular location may be displayed in a more accurate location as perceived from a particular viewpoint through the display. As an example, an image of the scene may be enhanced by additional text or image data at a particular point within the scene in the warped image. In one or more embodiment, the digital information may be associated with a particular object in the scene. When the object falls within the warped image (or, when the object is visible in the display), then the digital information associated with the object may be displayed along with the object in the warped image. In one or embodiment, as the warped image changes, whether a change in the scene occurs, or a change in the warping occurs due to a change in location of the viewpoint or the device relative to the scene, the digital information may also change.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   detect, at a first device, an indication that a touch event has occurred based on data received from an inertial measurement unit (IMU) on a second device that monitors movement of a touching object, wherein the touch event indicates contact between the touching object and a surface;
   in response to a touch event:
      obtain, by the first device, a touch image of the touching object, wherein the touching object is making contact with the surface in the touch image;
      detect an indication of a change in direction of the touching object based on additional data received from the IMU;
      capture a non-touch image of the touching object, wherein the touching object is not making contact with the surface in the non-touch image; and
      generate a model of the touching object based on the touch image and the non-touch image.

2. The non-transitory computer readable medium of claim 1, wherein the touching object comprises a finger and wherein the touch event occurs between the finger and the surface.

3. The non-transitory computer readable medium of claim 1, wherein the computer readable code to detect the indication that the touch event has occurred further comprise computer readable code to:
   determine that the touch event is a true touch event based on depth information from the touch image for the touching object and the surface.

4. The non-transitory computer readable medium of claim 3, wherein the computer readable code to capture the non-touch image further comprises computer readable code to:
   cause the non-touch image to be captured in accordance with a determination that the touch event is a true touch event, and a determination that the touching object has changed directions.

5. The non-transitory computer readable medium of claim 1, further comprising computer readable code to:
   determine a pose of the touching object at a touch point on the surface, wherein the model of the touching object is further generated based on the pose of the touching object.

6. The non-transitory computer readable medium of claim 5, further comprising computer readable code to:
   provide the model of the touching object to the second device for visual tracking of the touching object.

7. The non-transitory computer readable medium of claim 1, wherein the second device is a wearable device.

8. A method comprising:
   detecting, at a first device, an indication that a touch event has occurred based on data received from an inertial measurement unit (IMU) on a second device that monitors movement of a touching object, wherein the touch event indicates contact between the touching object and a surface;
   in response to a touch event:
      obtaining, by the first device, a touch image of the touching object, wherein the touching object is making contact with the surface in the touch image;
      detecting an indication of a change in direction of the touching object based on additional data received from the IMU;
      capturing a non-touch image of the touching object, wherein the touching object is not making contact with the surface in the non-touch image; and
      generating a model of the touching object based on the touch image and the non-touch image.

9. The method of claim 8, wherein the touching object comprises a finger and wherein the touch event occurs between the finger and the surface.

10. The method of claim 8, wherein detecting the indication that the touch event has occurred further comprises:
   determining that the touch event is a true touch event based on depth information from the touch image for the touching object and the surface.

11. The method of claim 10, wherein capturing the non-touch image further comprises:
   causing the non-touch image to be captured in accordance with a determination that the touch event is a true touch event, and a determination that the touching object has changed directions.

12. The method of claim 8, further comprising:
   determining a pose of the touching object at a touch point on the surface, wherein the model of the touching object is further generated based on the pose of the touching object.

13. The method of claim 12, further comprising:
   providing the model of the touching object to the second device for visual tracking of the touching object.

14. The method of claim 8, wherein the second device is a wearable device.

15. A system comprising:
   one or more processors; and
   one or more computer readable media comprising computer readable code executable by the one or more processors to:
      detect, at a first device, an indication that a touch event has occurred based on data received from an inertial measurement unit (IMU) on a second device that monitors movement of a touching object, wherein the touch event indicates contact between the touching object and a surface;
      in response to a touch event:
         obtain, by the first device, a touch image of the touching object, wherein the touching object is making contact with the surface in the touch image;
         detect an indication of a change in direction of the touching object based on additional data received from the IMU;
         capture a non-touch image of the touching object, wherein the touching object is not making contact with the surface in the non-touch image; and
         generate a model of the touching object based on the touch image and the non-touch image.

16. The system of claim 15, wherein the touching object comprises a finger and wherein the touch event occurs between the finger and the surface.

17. The system of claim 15, wherein the computer readable code to detect the indication that the touch event has occurred further comprise computer readable code to:
   determine that the touch event is a true touch event based on depth information from the touch image for the touching object and the surface.

18. The system of claim 17, wherein the computer readable code to capture the non-touch image further comprises computer readable code to:
   cause the non-touch image to be captured in accordance with a determination that the touch event is a true touch event, and a determination that the touching object has changed directions.

19. The system of claim 15, further comprising computer readable code to:
   determine a pose of the touching object at a touch point on the surface, wherein the model of the touching object is further generated based on the pose of the touching object.

20. The system of claim 19, further comprising computer readable code to:
   provide the model of the touching object to the second device for visual tracking of the touching object.

* * * * *